3,167,589
SOLID REACTION PRODUCTS OF AMINES AND NON-VOLATILE REACTION PRODUCTS OF DIBORANE AND CONJUGATED DIOLEFIN HYDROCARBONS
Eugene J. De Lorenzo, Bronx, N.Y., and Robert V. Wright, North Highland, Calif., assignors to Olin Mathieson Chemical Corporation, a corporation of Virginia
No Drawing. Filed Apr. 20, 1961, Ser. No. 104,470
12 Claims. (Cl. 260—583)

This invention relates to solid reaction products of certain amines and the non-volatile product of the reaction of a conjugated diolefin hydrocarbon and diborane.

The solid products of this invention when incorporated with suitable oxidizers, such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as the pyrotechnic type igniter, and are mechanically strong enough to withstand ordinary handling.

The solid reaction products of this invention are prepared by reacting the non-volatile products of the reaction of a conjugated diolefin hydrocarbon and diborane with a polyamine containing from two to eight carbon atoms.

Suitable non-volatile products of the reaction of conjugated diolefin hydrocarbons and diborane can be prepared according to the methods described in U.S. application Serial No. 104,471, filed April 20, 1961, of De Lorenzo and Wright and U.S. application Serial No. 104,474, filed April 20, 1961, of De Lorenzo and Wright. Suitable polyamines include, saturated aliphatic primary and secondary polyamines, for example, ethylenediamine, propylenediamine, trimethylenediamine, 1,3-diaminobutane, putrescine, cadaverine, hexamethylenediamine, octamethylenediamine, diethylenetriamine, triethylenetetramine, and tetraethylenepentamine.

The ratio of reactants can be varied widely, generally being in the range 0.1 to 10 moles of non-volatile diolefin-diborane product per mole of amine, preferably 1:1 to 3:1. The reaction temperature can vary from 0° C. to 75° C. and the pressure can vary from subatmospheric to several atmospheres, i.e. from 0.2 to 5.0 atmospheres. The reaction to go to completion generally requires from one to twenty-four hours depending upon the ratio of reactants, the particular reactants utilized, and the temperature and pressure employed.

Although the reaction will proceed in the absence of a solvent, best results are obtained by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants.

The following examples illustrate the process of this invention.

The diolefin-diborane product employed in these examples was prepared in accordance with the process set forth in U.S. application Serial No. 104,474, filed April 20, 1961, of De Lorenzo and Wright. In the specific reaction 0.749 mole of butadiene and 0.1498 mole of diborane were condensed into a 170 cc. previously evacuated high pressure bomb maintained at about −196° C. containing 0.19 mole of n-pentane. This mixture was heated slowly at a rate of about 4–5 degrees per minute in an oil bath to a temperature of about 68° C. at which time the temperature of the reaction mixture in the bomb surged to above 125° C. and the pressure surged to 240 p.s.i.g. The bomb was removed from the oil bath and the bomb temperature and pressure both rapidly subsided. The product was then removed from the bomb in a nitrogen dry box and analyzed. The reaction products consisted of both volatile and non-volatile products. The boron content of the separated non-volatile liquid product was about 19.5%. The non-volatile product thus produced was employed in the following examples.

*Example I*

In this example 3.12 cc. of a 4 percent by weight and volume solution in benzene of the butadiene-diborane product (3 cc. of benzene and 0.12 cc. of product) was added to 3.12 cc. of a 4 percent solution of ethylenediamine in benzene. The reaction mixture was allowed to stand for 3 hours at room temperature and bubbling was observed. It was then heated to 50° C. for 2 hours at which time bubbling ceased and a sticky residue and a clear solution remained. The residue was removed by filtration and washed with benzene, leaving a white powder-like solid weighing 0.881 grams.

*Example II*

Following the same procedure as in Example I, 3.12 cc. of a 4 percent benzene solution of diethylenetriamine was reacted with 3.12 cc. of the 4 percent butadiene-diborane solution. The same white powder-like solid was obtained as a product but in a lesser quantity than in Example I.

*Example III*

In this example a 4 percent solution of the butadiene-diborane product in the benzene was prepared by dissolving 1.5 cc. of product in 37 cc. of benzene. The solution containing 0.0163 mole of butadiene-diborane product (based on an unit molecular weight of 82). To this solution was added a 4 percent solution of ethylenediamine (1.5 cc. dissolved in 3.26 cc. of benzene) containing 0.00204 mole of ethylenediamine. There was an immediate formation of a white crystalline solid with bubbling. The mixture was then heated for 2 hours at 50° C. to assure complete reaction. The solid was separated by filtration and weighed, 0.1985 grams.

To the filtrate was added another portion of 4 percent solution of ethylene diamine containing 0.00204 mole of ethylenediamine with formation of additional white solid (0.269 grams) accompanied by bubbling.

This procedure was repeated twice and 0.3527 and 0.2925 grams of white solid were recovered. A total of 0.00816 mole of ethylenediamine had reacted. The addition of further ethylenediamine would not cause a precipitate to form and infrared analysis showed no unreacted butadienediborane product remaining. This example shows that approximately 0.5 mole of diamine per mole of butadiene-diborane product is required for complete precipitation of the borane from solution.

The solids produced from the initial reaction of Example III had the following elemental analysis.

| | Percent |
|---|---|
| Boron | 19.50 |
| Carbon | 37.51 |
| Hydrogen | 8.43 |
| Nitrogen | 9.32 |
| Total | 74.76 |

A 0.0974 gram sample of another portion of the solid produced in Example III was mixed with 13 cc. of purified tetrahydrofuran and allowed to remain at room temperature for 2 hours. The mixture was then filtered to separate the undissolved reaction product which was dried and weighed. The undissolved reaction product was 0.0397 gram or 41 percent of the original amount. This procedure was repeated with 0.17 gram of reaction product in 13 cc. of tetrahydrofuran and 0.0908 gram or 47 percent was undissolved.

The tetrahydrofuran was removed from the soluble portion and the melting point of the residue was determined to be 80 to 85° C. The insoluble portion sublimed between 160° C. and 200° C.

Infrared analysis of the soluble and insoluble portions indicated that they were essentially the same except for variations in the intensity ratios of the components present. Infrared analysis also indicated that the ethylenediamine reaction with the butadiene-diborane product is accompanied by the disappearance of active hydrogen.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron containing material and from 65 to 90 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethan type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of a resin such as that mentioned previously or a prepolymer of the resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A process for the preparation of solid reaction products of amines and non-volatile reaction products of diborane and conjugated diolefin hydrocarbons which comprises reacting a polyamine selected from the group consisting of a saturated aliphatic primary polyamine containing from 2 to 8 carbon atoms and a saturated aliphatic secondary polyamine containing from two to eight carbon atoms with a non-volatile product of the reaction of diborane and a conjugated diolefin hydrocarbon, said non-volatile reaction product being the product of the reaction of 2 to 4 moles of diborane per mole of a conjugated diolefin hydrocarbon containing from four to five carbon atoms at a temperature of from about $-10°$ C. to about $+200°$ C. in the presence of an organic solvent selected from the group consisting of hydrocarbon solvents and lower dialkyl ethers.

2. A process for the preparation of solid reaction products of amines and non-volatile reaction products of diborane and conjugated diolefin hydrocarbons which comprises reacting from 0.1 to 10 moles of a non-volatile product of the reaction of diborane and a conjugated diolefin hydrocarbon per mole of a polyamine selected from the group consisting of a saturated aliphatic primary polyamine containing from 2 to 8 carbon atoms and a saturated aliphatic secondary polyamine containing from two to eight carbon atoms in the presence of a solvent inert with respect to the reactants at a temperature of 0° C. to 75° C., said non-volatile reaction product being the product of the reaction of 2 to 4 moles of diborane per mole of a conjugated diolefin hydrocarbon containing from four to five carbon atoms at a temperature of from about $-10°$ C. to about $+200°$ C. in the presence of an organic solvent selected from the group consisting of hydrocarbon solvents and lower dialkyl ethers.

3. The process of claim 2 in which the amine is ethylenediamine.

4. The process of claim 2 in which the amine is diethylenetriamine.

5. The process of claim 2 in which the amine is ethylenediamine and the inert solvent is benzene.

6. A process for the preparation of solid reaction products of amines and non-volatile reaction products of diborane and conjugated diolefin hydrocarbons which comprises reacting from 1 to 3 moles of said non-volatile product per mole of a polyamine selected from the group consisting of a saturated aliphatic primary polyamine containing from 2 to 8 carbon atoms and a saturated aliphatic secondary polyamine containing from two to eight carbon atoms in the presence of a solvent inert with respect to the reactants at a temperature from about 20° C. to about 65° C., said non-volatile product being the product of the reaction of 2 to 4 moles of diborane per mole of a conjugated diolefin hydrocarbon containing from four to five carbon atoms at a temperature from about $-10°$ C. to about $+200°$ C. in the presence of an organic solvent selected from the group consisting of hydrocarbon solvents and lower dialkyl ethers.

7. The process of claim 6 in which the organic solvent is a hydrocarbon solvent.

8. The process of claim 7 in which the amine is ethylenediamine the inert solvent is benzene, the conjugated diolefin hydrocarbon is 2,3-butadiene and the hydrocarbon solvent is n-pentane.

9. The process of claim 7 in which the amine is diethylenetriamine, the inert solvent is benzene the conjugated diolefin hydrocarbon is 1,3-butadiene and the organic solvent is n-pentane.

10. The product produced by the process of claim 1.
11. The product produced by the process of claim 8.
12. The product produced by the process of claim 9.

No references cited.

CHARLES B. PARKER *Primary Examiner.*

L. D. ROSDOL, *Examiner.*

UNITED STATES PATENT OFFICE
CERTIFICATE OF CORRECTION

Patent No. 3,167,589            January 26, 1965

Eugene J. De Lorenzo et al.

It is hereby certified that error appears in the above numbered patent requiring correction and that the said Letters Patent should read as corrected below.

Column 4, line 60, for "2,3-butadiene" reead -- 1,3-butadiene --.

Signed and sealed this 15th day of June 1965.

(SEAL)
Attest:

ERNEST W. SWIDER            EDWARD J. BRENNER
Attesting Officer             Commissioner of Patents